United States Patent [19]

Ayers

[11] Patent Number: 4,458,576
[45] Date of Patent: Jul. 10, 1984

[54] STROKING MECHANISM

[75] Inventor: Ray R. Ayers, Houston, Tex.

[73] Assignee: Shell Oil Company, Houston, Tex.

[21] Appl. No.: 464,091

[22] Filed: Feb. 4, 1983

Related U.S. Application Data

[63] Continuation of Ser. No. 218,233, Dec. 19, 1980, abandoned, and a continuation-in-part of Ser. No. 113,985, Jan. 21, 1980.

[51] Int. Cl.³ .......................... F01B 19/00; F42B 3/10
[52] U.S. Cl. ........................................ 89/1 B; 92/101; 102/275.11
[58] Field of Search ..................... 89/1 B; 102/275.11, 102/512, 428; 73/731; 92/89, 90, 92, 101, 104, 105; 200/82 R, 83 R, 83 B, 83 J; 137/67; 138/89

[56] References Cited

U.S. PATENT DOCUMENTS

| 2,204,816 | 6/1940 | Niederreither | 137/67 |
| 2,208,149 | 7/1940 | Vernet | 92/101 X |
| 2,368,181 | 1/1945 | Vernet | 200/83 B |
| 2,507,466 | 5/1950 | De Craene | 92/101 X |
| 2,692,618 | 10/1954 | Ludowici | 92/101 |
| 2,913,904 | 11/1959 | Baker | 92/101 X |
| 3,112,382 | 11/1963 | Baker | 200/82 R |
| 3,119,302 | 1/1964 | Barr | 89/1 B |
| 3,313,264 | 4/1967 | Keller | 92/89 X |
| 3,386,345 | 6/1968 | Taplin | 92/101 X |
| 3,420,105 | 1/1969 | Winter | 92/101 X |
| 3,946,759 | 3/1976 | Mercier | 92/92 X |
| 4,142,544 | 3/1979 | Straub | 137/67 |
| 4,209,185 | 6/1980 | St. Clair et al. | 200/82 R X |

Primary Examiner—David H. Brown

[57] ABSTRACT

A stroking mechanism in accordance with the invention includes a partially buckled, hollow chamber susceptible to further buckling at preselected pressure and a plunger within the chamber. The plunger is at least partly expelled from the chamber upon further buckling of the chamber by pressure.

8 Claims, 5 Drawing Figures

FIG.2A MECHANICALLY DENT THE CENTER OF A CAPPED STUB PIPE.

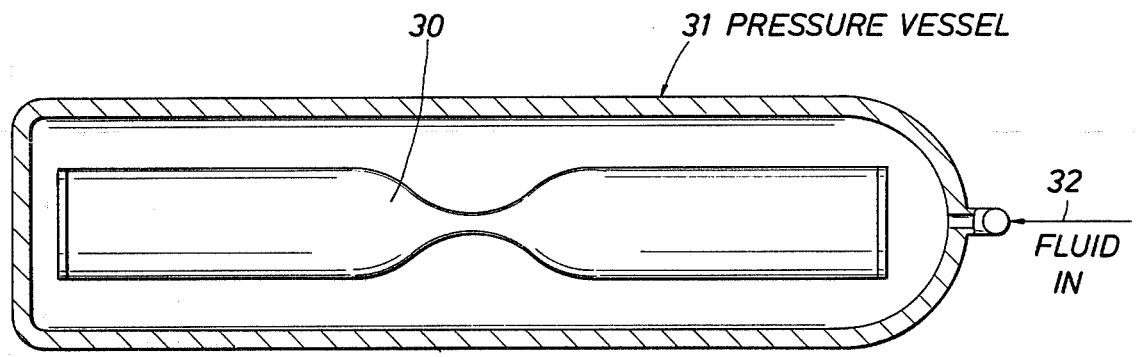
FIG. 2B   PLACE PIPE IN PRESSURE VESSEL AND PROPAGATE BUCKLE SOMEWHAT FURTHER BY PUMPING HYDRAULIC FLUID (OR WATER) INTO THE VESSEL. NOTE THE PRESSURE REQUIRED TO PROPAGATE THE BUCKLE: THIS WILL BE RELEASE PRESSURE OF THE RELEASE MECHANISM.
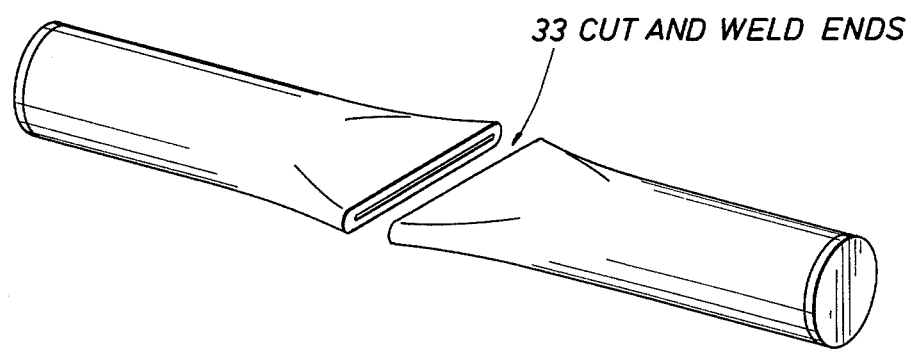
FIG. 2C   CUT PIPE IN HALF AND WELD SHUT THE ENDS. PLACE RING HOLD IN FLATTEND TIP, MAKING SURE THE PIPE ELEMENT REMAINS PRESSURE TIGHT.

STROKING MECHANISM

This application is a continuation of application Ser. No. 218,233 filed Dec. 19, 1980, now abandoned, and a continuation-in-part of application Ser. No. 113,985 filed Jan. 21, 1980.

BACKGROUND OF THE INVENTION

A stroking mechanism is commonly used to trigger or activate any type of process when a preselected event occurs, for example, an increase in pressure to a designated value. For example, the type of device to be triggered may be an explosive to be detonated. It is particularly desirable that the mechanism activating the stroking mechanism be particularly reliable and inexpensively constructed. It will be apparent from the following description that the present invention completely fulfills these requirements.

SUMMARY OF THE INVENTION

A stroking mechanism is provided by the present invention which is useful for triggering or activating a process when a preselected event occurs, for example, an increase in pressure to a designated valve.

Preferably, the stroking mechanism of the invention includes a partially buckled, hollow chamber susceptible to further buckling at a preselected pressure and a plunger within the chamber, the plunger being adapted to at least partly expel from the chamber upon said further buckling. More preferably, the plunger is a rod terminating at one end in a conical piece, the chamber is a cylinder with at least one partially buckled end closure, and the conical piece is approximately the same diameter as the interior of the chamber.

DESCRIPTION OF THE DRAWINGS

FIGS. 2A, 2B and 2C show the steps involved in making end closures for the stroking mechanism of the invention.

DESCRIPTION OF PREFERRED EMBODIMENTS

The present invention provides a technique for utilization of a failure mechanism, i.e., the gross flattening of a cylindrical vessel under external pressure, to perform useful work through the pressure-actuated expulsion of a plunger operatively connected to another device. The nature of the so-called propagating buckle of a cylindrical vessel under external pressure is such that there is a large change in shape from, for instance, a round pipe to its fully flattened shape. In this way, the actuation or triggering, of the vessel can be made to cause a large release stroke. This large stroke makes it possible to use this type of failure device in a stroking mechanism.

Figure 1A:
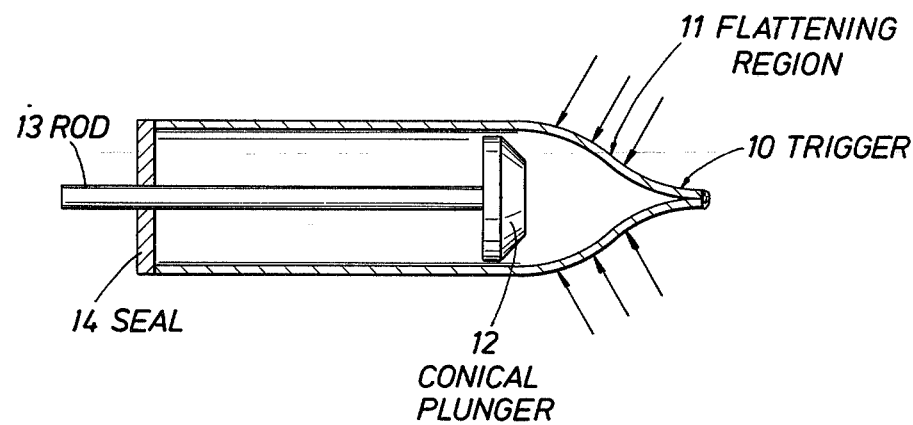
FIGS. 1A and 1B of the drawings disclose a cut-away view of the stroking mechanism of the present invention.
Figure 1B:
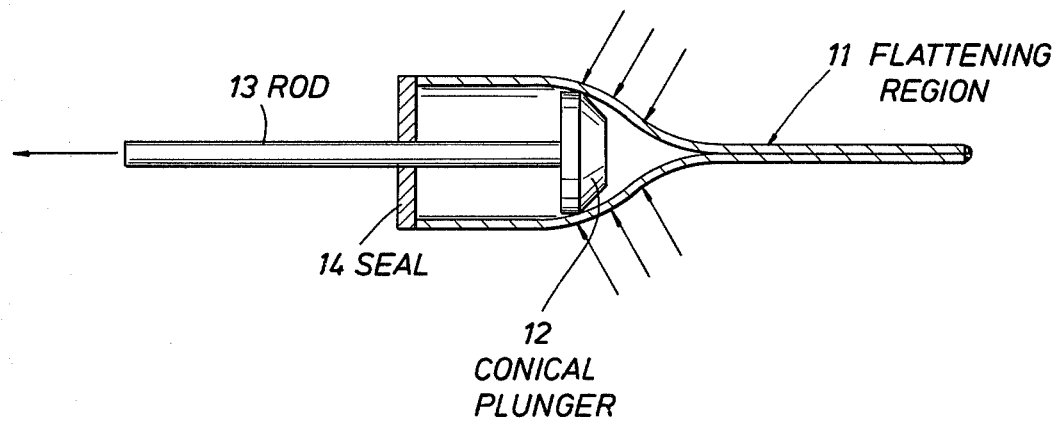
Figure 1B:
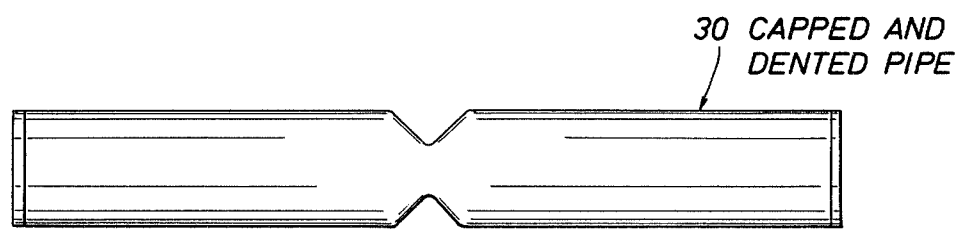

Referring now to the drawings and in particular to FIGS. 1A and 1B thereof, there is shown a stroking mechanism which includes a trigger 10 having a precollapsed flattening region 11 which, upon further pressure, will extend the remaining length of the trigger 10 to fully flatten it and expel plunger 12 attached to a rod 13 passing through seal 14. Rod 13 is attached to work means (not shown) capable of performing a useful function, for example detonating an explosive. It will be understood that other structures may be substituted for the trigger 10 which are not cylindrical in shape and that the conical plunger 12 may likewise incorporate shapes other than conical. In addition, it may be useful to provide wheels (not shown) under the conical plunger to facilitate its being expelled out of the trigger 10. The seal 14 is generally of elastomeric or similar material which will readily bend in order to facilitate the complete flattening of trigger 10 once a propagating buckle initiates.

In FIGS. 2A, 2B and 2C the steps of making a partially buckled or partially collapsed chamber for trigger 10 are shown in steps A, B, and C. In Step A, a chamber such as a capped pipe 30 is mechanically dented in the center. Chambers which are triangular, rectangular or elliptical in shape may be employed, and other techniques for denting the chamber may be effected using presses, hammers, etc. In Step B, a pressure vessel 31 encompasses the capped and dented pipe 30 and a hydraulic fluid 32 under pressure is passed thereinto. The buckle initiated in Step B is propagated by the hydraulic fluid. The pressure required to propagate the buckle is noted since this will become the characteristic collapse pressure of the chamber or trigger. In Step C, the pipe is cut in half and welded or otherwise closed at midsection 33. Preferably, a ring hold is placed in the flattened tip of the pipe, making sure the pipe element remains pressure tight.

I claim:

1. A stroking mechanism comprising a partially collapsed closed vessel susceptible to substantially collapsing into a flattened configuration only beginning at a preselected fluid pressure and a plunger within said vessel, said plunger being adapted to at least partly expel from said vessel upon said substantially collapsing.

2. The mechanism of claim 1 wherein the plunger comprises a rod terminating at one end in a conical piece.

3. The mechanism of claim 2 wherein the vessel is a cylinder with at least one partially collapsed end closure.

4. The mechanism of claim 3 wherein the conical piece is approximately the same diameter as the interior of the vessel.

5. The mechanism of claim 3 wherein the conical piece is adjacent the partially collapsed end closure.

6. The mechanism of claim 3 wherein the rod extends through a seal in the vessel opposite to the partially collapsed end closure.

7. A method for actuating a stroking mechanism, comprising providing a partially collapsed closed vessel which is susceptible to substantially collapsing into a flattened configuration at a preselected fluid pressure, disposing a plunger within said vessel, and expelling said plunger by the collapsing of said vessel into a flattened configuration.

8. The method of claim 7 wherein the vessel is a closed cylinder which is collapsed at one end, the plunger is a rod extending through a wall of the cylinder opposite the collapsed end and terminating in a conical head abutting the collapsed end, and the rod is expelled by the cylinder substantially fully collapsing from the one end which is partially collapsed and proceeding toward the other end until a fully flattened configuration occurs, simultaneously pushing the conical head in front of the collapsing part of the cylinder.

* * * * *